US005421409A

United States Patent [19]

Mueller et al.

[11] Patent Number: 5,421,409
[45] Date of Patent: Jun. 6, 1995

[54] SLAG-BASED WELL CEMENTING COMPOSITIONS AND METHODS

[75] Inventors: Dan T. Mueller, The Woodlands; Jimmy P. Dickerson, Spring, both of Tex.

[73] Assignee: BJ Services Company, Houston, Tex.

[21] Appl. No.: 220,340

[22] Filed: Mar. 30, 1994

[51] Int. Cl.$^6$ .................. E21B 33/14; C04B 7/14; C04B 7/147; C04B 7/153
[52] U.S. Cl. .................. 166/292; 166/293; 106/789
[58] Field of Search ............ 166/293, 292; 106/707, 106/739, 789, 790

[56] References Cited

U.S. PATENT DOCUMENTS

| | | | |
|---|---|---|---|
| 4,132,555 | 1/1979 | Barrable | 106/90 |
| 4,968,349 | 11/1990 | Virtanen | 106/707 |
| 5,058,679 | 10/1991 | Hale et al. | 166/293 |
| 5,106,423 | 4/1992 | Clarke | 106/789 |
| 5,125,455 | 6/1992 | Harris et al. | 166/292 |
| 5,183,506 | 2/1993 | Zhang | 106/739 |

*Primary Examiner*—Stephen J. Novosad
*Attorney, Agent, or Firm*—Charles D. Gunter, Jr.; Grady K. Bergen

[57] ABSTRACT

By the addition of wollastonite to slag based cements, such as those formed when converting drilling fluids to cementitious materials in oil and gas well applications, the flexural strength of the cementitious material is improved. The method involves forming a pumpable slurry of drilling fluid, blast furnace slag and the fibrous mineral, wollastonite. The slurry is then activated by the addition of such activators as sodium hydroxide and soda ash and is pumped into the well bore to a desired location and is allowed to solidify.

12 Claims, No Drawings

SLAG-BASED WELL CEMENTING COMPOSITIONS AND METHODS

BACKGROUND OF THE INVENTION

1. Field of the Invention

This invention relates to improved slag-based cementing composition and to improved methods of using such compositions for cementing oil and gas wells.

2. Description of the Prior Art

During construction of oil and gas wells, a rotary drill is typically used to bore through subterranean formations of the earth to form a borehole. As the rotary drill bores through the earth, a drilling fluid, known in the industry as a "mud," is circulated through the borehole. Drilling fluids are usually pumped from the surface through the interior of the drill pipe. By continuously pumping the drilling fluid through the drill pipe, the drilling fluid can be circulated out the bottom of the drill pipe and back up to the well surface through the annular space between the wall of the well bore and the drill pipe. The hydrostatic pressure created by the column of mud in the hole prevents blowouts which would otherwise occur due to the high pressures encountered within the well. The drilling fluid is also used to help lubricate and cool the drill bit and facilitates the removal of cuttings as the borehole is drilled.

Once the well bore has been drilled, casing is lowered into the well bore. A cement slurry is then pumped into the casing and a plug of fluid, such as drilling mud or water, is then pumped behind the cement slurry in order to force the cement up into the annulus between the exterior of the casing and the borehole. The cement slurry is then allowed to set and harden to hold the casing in place. The cement also provides zonal isolation of the subsurface formations, helps to prevent sloughing or erosion of the well bore and protects the well casing from corrosion from fluids which exist within the well.

Typically, hydraulic cements, particularly Portland cements, are used to cement the well casing within the well bore. Hydraulic cements are cements which set and develop compressive strength due to the occurrence of a hydration reaction which allows them to set or cure under water. The physical properties of the set hydraulic cement relate to the crystalline structure of the calcium-silicate-hydrates formed during hydration. Conventional Portland cements form an interlocking crystalline network of, for example, tricalcium silicate, dicalcium silicate, tetracalcium aluminum ferrite and calcium hydroxide crystals. These crystals interconnect to form an interlocking crystalline structure which provides both flexural strength and a degree of resiliency.

In recent years, there has been growing emphasis on the conversion of drilling fluids to cementitious slurries so that the converted drilling fluid can be pumped into the casing and used to cement the casing within the well bore. One characteristic of such drilling fluids which are convertible "in situ" to a cement is the addition of blast furnace slag which initiates the setting or hardening of the converted drilling fluid.

Blast furnace slags, which are produced as a by-product during the smelting process of metal ores, have been used in the past for cementing purposes in the oil and gas well industries. The use of these slags is an economical means of converting the drilling fluid to a cementitious composition. Set slag cements, however, have less flexural strength and are more brittle than their Portland cement counterparts. This brittleness may result in excessive damage of the cement during perforating operations and may also reduce the structural integrity of the cement surrounding the casing.

SUMMARY OF THE INVENTION

It is an object of the invention to provide a slag-type cement having improved physical characteristics. The improved cement should have increased flexural strength and less brittleness. In addition, the improved cementing product should be less expensive. It is also an object of this invention to provide a method for converting drilling fluids to a cementitious material which can be used for oil and gas well cementing operations which has improved flexural strength and decreased brittleness.

A composition and method of cementing a well bore are disclosed in which an aqueous drilling fluid is solidified within the borehole of an oil or gas well by first forming a slurry of drilling fluid, blast furnace slag, a silicate mineral having a fibrous, crystalline structure and water so that the slurry is pumpable. The slurry is then activated and pumped within the well bore to a preselected location and is allowed to solidify within the well bore.

Additional objects, features and advantages will be apparent in the written description which follows.

DETAILED DESCRIPTION OF THE INVENTION

Blast furnace slag is a cementitious material which is hydraulically active. In this disclosure, the term "hydraulically active" refers to properties of a cementitious material that allow the material to set in a manner like hydraulic cement, either with or without additional activation. Typically, activators, such as sodium hydroxide (caustic) and soda ash, are mixed with the slag in order to initiate the hydration reaction which causes the resulting slag cement to set or harden. The use of blast furnace slag as a cementing material is preferred in many cases because of its low cost in relation to other cements. Other hydraulic cements include Portland cement, aluminous cements, pozzolan cements, fly ash cements, and the like. Often, slag is mixed in combination with these cements in order to offset the costs of cementing.

Set slag cements are believed to have a crystalline structure containing discrete crystals which lack an interlocking network of mineral species, such as is found in other cements, for example Portland cement. As a result, slag cements have less flexural strength and are more brittle than their Portland cement counterparts. The nature of the fracture created upon impact in set slag cements is smoothly curved or conchoidal in nature, with large fragments being broken off.

The addition of fibrous minerals, such as wollastonite, has been found to improve the flexural strength and reduce the brittleness of these slag cements without significantly altering their compressive strengths. These fibrous minerals may be carbonate or silicate minerals having a fibrous, aggregate crystal structure. The term "silicate" as used herein refers to those compounds containing silicon, oxygen, and one or more metals. Suitable fibrous minerals include wollastonite, brucite, trona, sillimanite, sepiolite and pyrophyllite. The preferred mineral, however, is wollastonite.

Wollastonite is a natural occurring calcium metasilicate mineral which is found in metamorphic rock formations in New York and California. Wollastonite has been used in the past in the pottery and cement product industry for the manufacture of cement board and tile. Wollastonite is an acicular fiber which forms a fibrous, crystalline structure in its aggregate or polycrystalline form. The wollastonite used in the invention consists of micro-fibers with the same approximate diameter as cement particles, i.e. 25 to 40 microns, with a length of 0.4 to 0.6 millimeters.

The addition of wollastonite to a cement matrix has been shown to improve the flexural strength characteristics and resulted in a significant beneficial modification of the pre-peak and post-peak load behaviors as demonstrated by load deflection curves. Testing of slag cements containing as little as 5% wollastonite indicates that the crystalline structure has been altered. Whereas normal slag cements have the conchoidal fracture, samples containing as little as 5% wollastonite have shown fractures which fracture in a multidirectional way, similar to that of Portland cement. These fractures have also resulted in only small fragments being produced when impacted.

Other additives to the slag cements include activators, retarders, dispersants and viscosity reducers. Activators aid in controlling the rate of cure or setting time of the cement. These activators include such compounds as sodium hydroxide, sodium carbonate, calcium oxide, calcium hydroxide, magnesium hydroxide, magnesium oxide, sodium sulfate, calcium sulfate, calcium nitrate, calcium nitrite, zinc oxide, zinc carbonate, titanium carbonate and potassium hydroxide. Examples of deflocculants or dispersants include such compounds as lignosulfonates, napthalene sulfonates, phenol sulfonates, phosphates, phosphonates, sulfonated styrene maleic anhydride, sulfonated styrene maleimide, polyacrylates and polymethacrylates.

Blast furnace slag is also commonly used to convert drilling muds into cementitious materials. For example, see U.S. Pat. No. 5,058,679, issued Oct. 22, 1991, to Hale et al., entitled "Solidification of Water Based Muds," which is hereby incorporated by reference. When slag is mixed with the drilling fluid, the mixture becomes hydraulically active. The slag/drilling fluid mixture may also have minor amounts of extenders such as bentonite, gilsonite, and cementitious material used either without any appreciable sand or aggregate material or admixed with a granular filling material such as sand, ground limestone and the like. The slag used to convert drilling fluids to hydraulically active cements typically have a fineness or specific surface area ranging between 3,000 to 12,000 cm$^2$ per gram. Preferably, the slag has a fineness between 4000 to 7000 cm$^2$ per gram, most preferably 5500 cm$^2$ per gram.

In cementing the well bore of an oil or gas well, a pumpable slurry is formed by diluting a conventional aqueous drilling fluid with water. The conventional aqueous drilling fluid may be any type of aqueous drilling fluid, such as the lignosulfonate mud used in the examples described below. Lignosulfonate muds are well known in the art. A typical formulation includes, for example, 10 pounds per barrel (ppb) bentonite, 10 ppb lignin/lignite filtrate control additive, 0.4 ppb lignosulfonate deflocculant and 100 ppb barite weighing agent. Blast furnace slag and wollastonite are then added to the diluted drilling fluid. The total amount of slag and wollastonite added to the diluted drilling fluid is typically around 250 pounds per 42 gallon barrel. The amount of wollastonite in the slag/wollastonite blend may range anywhere from 5 and 50 percent by weight, with the preferred range being between 20 and 30 percent.

After the slurry is formed, the slurry is activated by the addition of an activator, such as soda ash and caustic, and is pumped into the well bore using conventional methods so that the slurry fills the annular space between the casing and the wall of the borehole. The slurry is then allowed to solidify within the well bore.

EXAMPLES

The examples which follow further illustrate the invention. In most of the examples, the compressive strengths were determined using testing procedures in accordance with API RP10B, Section 7, Jul. 1, 1990 (Spec. 10). The unconfined compressive strength of slag cubes was determined by compressing the cubes at a constant strain rate of 0.0033% per second. The unconfined compressive strength is defined as the maximum compressive load at failure divided by the original area of the cube exposed by the load and is represented by the formula:

$$\sigma_c = F/A$$

where $\sigma_c$ is the maximum compressive load, F is the load at failure, and A is the original area of the cube. The unconfined compressive strengths for cement cubes is a well known and often measured rock mechanics parameter. Cements with high values of compressive strength are usually considered better for subsurface engineering applications such as cementing casing and setting pipe.

The strain at failure is defined as the maximum change in length at failure divided by the original cube length and is given by the following formula:

$$\epsilon = \Delta L / L_0$$

where $\epsilon$ is the strain at failure, $\epsilon L$ is the fractional change in length, and $L_0$ is the original unstrained length. The strain at failure is a relatively unknown or unused parameter in oil field applications, however, it can be a very important parameter in applications where the load on casing or pipe, both radially and axially, is subject to change caused by the changes in the length or radius of the casing. These changes may be caused by changes in temperature or pressure which, in turn, cause the cement to crack or fail after the cement has set. For a given compressive strength, cements or slags with higher strains at failure are better for oil well applications because the cements are more flexible to subsurface changes caused by changes in pressure or temperature. A higher strain at failure indicates better flexural strength and reduced brittleness.

As used in the examples, the barrel volume was a standard 42 gallon barrel. A standard was formed by using a drilling fluid which comprised a lignosulfonate mud having the composition previously recited. The mud had an initial density of 12 pounds per gallon (ppg) and was diluted with water to 10.5 ppg. Eight pounds per barrel of soda ash and 4 ppb of sodium hydroxide, plus 1 ppb of thinner/retarder, marketed under the trade name "DESCO" were also added to the drilling fluid. The diluted mud was then weighted to 14 pounds per gallon by the addition of 250 ppb of slag or a slag/wollastonite blend. The slag used in the samples of Table 1 was a slag having a fineness of 5,500 cm$^2$ per gram. Each sample was cured at atmospheric pressure for 72 hours at 120° F. The amount of slag/wollastonite mixture was varied and the average unconfined compressive strength and the strain at failure was determined for each sample and is shown in Table 1.

TABLE 1

| SAMPLE | Compressive Strength, $\sigma_c$ (psi) | Strain, $\epsilon$ (%) |
|---|---|---|
| Standard w/ 100% Slag | | |
| Run 1 | 3438 | 1.23 |
| Run 2 | 3438 | 1.20 |
| Run 3 | 3563 | 1.14 |
| Run 4 | 3000 | 1.24 |
| Run 5 | 3750 | 1.10 |
| Average | 3438 | 1.18 |
| St. Dev. | 276 | 0.06 |
| 80% Slag 20% Wollastonite | | |
| Run 1 | 3188 | 1.55 |
| Run 2 | 3125 | 1.30 |
| Run 3 | 3125 | 1.33 |
| Run 4 | 3125 | 1.33 |
| Run 5 | 3125 | 1.33 |
| Average | 3138 | 1.36 |
| St. Dev. | 28 | 0.10 |
| 70% Slag 30% Wollastonite | | |
| Run 1 | 2719 | 1.46 |
| Run 2 | 2719 | 1.53 |
| Run 3 | 2063 | 1.19 |
| Run 4 | 2750 | 1.31 |
| Run 5 | 2656 | 1.24 |
| Average | 2581 | 1.34 |
| St. Dev. | 292 | 0.15 |
| 50% Slag 50% Wollastonite | | |
| Run 1 | 1813 | 1.86 |
| Run 2 | 1844 | 1.28 |
| Run 3 | 1876 | 1.45 |
| Run 4 | 1813 | 1.56 |
| Run 5 | 1813 | 1.21 |
| Average | 1831 | 1.47 |
| St. Dev. | 28 | 0.26 |

As can be seen from Table 1, the addition of wollastonite to the drilling fluid significantly improved the strain values. While the compressive strengths were slightly reduced, this appears to be specific to the type of drilling fluid used in the samples of Table 1.

When added to traditional slag cement, wollastonite was shown to actually improve the compressive strengths of the cement. Nondestructive tests were conducted on samples of slag cement using a "Halliburton" ultrasonic cement analyzer (UCA). The results are shown in Table 2. The samples were formulated using water, 10 ppb bentonite, 10 ppb soda ash, 5 ppb caustic and 3 ppb calcium/sodium lignosulfonate retarder. Sample 1 contained 246 ppb blast furnace slag having a fineness of 6500 cm$^2$/g. Sample 2 contained 196 ppb blast furnace slag having a fineness of 6500 cm$_2$/g and 50 ppb wollastonite. The thickening times of both samples were ramped from 80° F. to 130° F. and 1000 to 5200 psi in 60 minutes.

TABLE 2

| SAMPLE | Thickening Time at 130° F. | UCA Compressive Strength at 190° F./3000 psi |
|---|---|---|
| Sample 1 | 4 hrs, 45 mins to 70 B$_c$ | 50 psi in 2 hrs, 24 mins<br>500 psi in 2 hrs, 52 mins<br>1260 psi in 24 hrs<br>1406 psi in 72 hrs |
| Sample 2 | 5 hrs, 19 mins | 50 psi in 2 hrs, 18 mins |

TABLE 2-continued

| SAMPLE | Thickening Time at 130° F. | UCA Compressive Strength at 190° F./3000 psi |
|---|---|---|
| | to 70 B$_c$ | 500 psi in 2 hrs, 43 min<br>1410 psi in 24 hrs<br>1638 in 72 hrs |

By way of comparison, tests were also performed on conventional cements without wollastonite. The following examples were tested under the same conditions as used for the samples of Table 1, with the unconfined compressive strengths and strains at failure shown in Table 3. Sample 3 consisted of 50% Type I, Class A cement, 50% Pozzolan A and 2% gel at 14 ppg. Sample 4 was an API Class "G" Portland cement. The results of the tests were as follows:

TABLE 3

| SAMPLE | Compressive Strength, $\sigma_c$ (psi) | Strain, $\epsilon$ (%) |
|---|---|---|
| Sample 3 | 3378 | 1.48 |
| Sample 4 | 5613 | 1.30 |

As can be seen in Table 3, the strain of the conventional cements was very similar to that of the samples of Table 1 containing wollastonite.

Tests on slag cements using other fibers were also conducted. Table 4 shows the results of samples tested using a 16 ppg slag slurry concentrate which was diluted to 14 ppg and activated with 2 ppb caustic. Sample 5 had by weight of pyrophyllite added to the slurry. Sample 6 had 0.5% by weight of polyethylene fibers added to the slurry.

TABLE 4

| SAMPLE | Compressive Strength, $\sigma_c$ (psi) | Strain, $\epsilon$ (%) |
|---|---|---|
| Sample 5 | 2000 | 1.54 |
| Sample 6 | 3050 | 1.78 |

As can be seen, the sample containing pyrophyllite, which is a silicate mineral, gave results similar to those samples containing wollastonite. While the sample containing polyethylene fibers showed good compression strength and strain, difficulty in mixing the polyethylene fibers with conventional cement mixing equipment makes their use impractical.

Wollastonite provides an excellent material for addition to slag-based cements used for cementing oil and gas wells. In particular, wollastonite is especially well suited for drilling fluids which are converted to cementitious materials by the addition of blast furnace slag. The addition of wollastonite to slag cements and converted drilling fluids can improve the flexural strength and decrease the brittleness of the resulting cement. It is less expensive than slag and by using blends of slag and wollastonite, the cost for converting drilling muds to cementitious materials can be reduced.

While the invention has been shown in only one of its forms, it is not thus limited but is susceptible to various changes and modifications without departing from the spirit thereof.

We claim:

1. A method of cementing a well borehole of an oil or gas well, the method comprising the steps of:

forming a pumpable slurry by mixing together a slag based cementitious material of a type suitable for cementing subterranean formations for oil and gas wells, a silicate mineral having a fibrous, crystalline structure and a sufficient amount of water, the mineral being selected from a group consisting of wollastonite, sillimanite, sepiolite and pyrophyllite;

pumping the slurry into a preselected location within the borehole of the well; and then allowing the slurry to solidify within the borehole.

2. The method of claim 1, further comprising:

activating the slurry prior to pumping the slurry into the preselected location.

3. The method of claim 1, wherein:

the mineral is wollastonite.

4. The method of claim 1, wherein:

the cementitious material is comprised of a drilling fluid and blast furnace slag.

5. A method of cementing a well borehole of an oil or gas well by solidifying an aqueous drilling fluid within the borehole, the method comprising the steps of:

forming a pumpable slurry by mixing the drilling fluid with blast furnace slag, a silicate mineral having a fibrous, crystalline structure and a sufficient amount of water, the silicate mineral being selected from a group consisting of wollastonite, sillimanite, sepiolite and pyrophyllite;

activating the slurry;

pumping the activated slurry into a preselected location within the borehole of the well; and allowing the slurry to solidify.

6. The method of claim 5, wherein:

the drilling fluid is a lignosulfonate mud.

7. The method of claim 5, wherein:

the weight ratio of the blast furnace slag to the silicate mineral ranges between 50:50 and 95:5.

8. The method of claim 5, wherein:

the silicate mineral is wollastonite.

9. A composition for cementing a well borehole, the composition comprising:

an aqueous drilling fluid;

a hydraulically active blast furnace slag for converting the drilling fluid into a cementitious material;

a silicate mineral having a fibrous, crystalline structure which is capable of reducing the brittleness of the cement composition once the composition has solidified, the mineral being selected from a group consisting of wollastonite, sillimanite, sepiolite and pyrophyllite; and water.

10. The composition of claim 9, further comprising:

an activator for activating the cementitious material.

11. The composition of claim 9, wherein:

the mineral is wollastonite.

12. The composition of claim 9, wherein:

the weight ratio of the slag to the silicate mineral ranges between 50:50 and 95:5.

* * * * *